United States Patent
Hong

(10) Patent No.: US 10,227,185 B2
(45) Date of Patent: Mar. 12, 2019

(54) GRAIN CONVEYING APPARATUS USING AIR

(71) Applicant: MI&MI Co., LTD, Gyeonggi-do (KR)

(72) Inventor: Young-Pyo Hong, Gyeonggi-do (KR)

(73) Assignee: MI&MI CO., LTD., Gyeonggi-Do (KR)

( * ) Notice: Subject to any disclaimer, the term of this patent is extended or adjusted under 35 U.S.C. 154(b) by 50 days.

(21) Appl. No.: 15/524,406

(22) PCT Filed: Oct. 8, 2015

(86) PCT No.: PCT/KR2015/010656
§ 371 (c)(1),
(2) Date: May 4, 2017

(87) PCT Pub. No.: WO2016/072626
PCT Pub. Date: May 12, 2016

(65) Prior Publication Data
US 2018/0282081 A1    Oct. 4, 2018

(30) Foreign Application Priority Data

Nov. 7, 2014 (KR) ........................ 10-2014-0154656

(51) Int. Cl.
*B65G 53/28* (2006.01)
*B65G 53/24* (2006.01)
(Continued)

(52) U.S. Cl.
CPC .............. *B65G 53/24* (2013.01); *B65G 53/34* (2013.01); *B65G 53/50* (2013.01); *B65G 53/52* (2013.01)

(58) Field of Classification Search
CPC ........ B65G 53/28; B65G 53/50; B65G 53/52; B65G 53/60
(Continued)

(56) References Cited

U.S. PATENT DOCUMENTS 1,844,642 A * 2/1932 Dornbrook ............ B65G 53/60
406/175
3,829,165 A * 8/1974 Boon ..................... B65G 53/60
406/171
(Continued)

FOREIGN PATENT DOCUMENTS

JP      59-120714 U    8/1984
JP      2007-225195 A  9/2007
(Continued)

OTHER PUBLICATIONS

International Search Report for Application No. PCT/KR2015/010656, dated Dec. 29, 2017 (4 pages).

*Primary Examiner* — Joseph A Dillon, Jr.
(74) *Attorney, Agent, or Firm* — K&L Gates LLP

(57) ABSTRACT

Disclosed is a grain conveying apparatus using air, the apparatus efficiently collecting foreign materials while moving grains upward to a position at which the grains are easily fed into a grain processing machine by using the suction force air, and preventing shock so as to prevent damage to the grains. The grain conveying apparatus using air, according to the present invention, comprises: a grain supply hopper for accommodating the grains; a conveyer pipe for guiding the grains supplied from the grain supply hopper and the air flowing in from an external air inlet such that the grains, by means of the air suction force, and the air are moved together; a grain discharge pipe connected to the end of the conveyer pipe; a separation pipe for separating the grains and the foreign materials, the separation pipe comprising a horizontal part connected to the grain discharge pipe and a downwardly curved part for dropping the grains; a rotary valve connected to the lower part of the curved part of the separation pipe so as to discharge the grains in predetermined amounts; an exhaust pipe for discharging the separated foreign materials to the outside; and an air suction means having a ring blower connected to the end of the
(Continued)

exhaust pipe so as to suck the air, wherein the front end of the grain discharge pipe is provided to penetrate the lower side of a finishing plate for closing a coupled part of the separation pipe, an inner diameter of the grain discharge pipe and an inner diameter of the separation pipe are formed to be small in a ratio of 0.4 to 0.5:1 such that the internal pressure of the separation pipe is lowered due to a change in the pressure difference, and a cut inclined surface, to be inclined in the direction of the grain conveyer pipe, is formed at the lower part of the front end of the grain discharge pipe, so as to cover the upper part thereof in order not to be influenced by the air discharged to the exhaust pipe connected to the upper side of the separation pipe, and allows the grains to be discharged to the lower side of the horizontal part of the separation pipe having a large inner diameter.

1 Claim, 4 Drawing Sheets

(51) Int. Cl.
  *B65G 53/34* (2006.01)
  *B65G 53/50* (2006.01)
  *B65G 53/52* (2006.01)

(58) Field of Classification Search
  USPC .............................................. 406/90, 91, 175
  See application file for complete search history.

(56) References Cited

U.S. PATENT DOCUMENTS

| | | | | |
|---|---|---|---|---|
| 3,947,071 | A * | 3/1976 | Wightman | B65G 53/4616 406/62 |
| 4,299,683 | A * | 11/1981 | Adorno | C25C 3/14 204/246 |
| 4,988,240 | A * | 1/1991 | Thompson | B65G 53/52 406/158 |
| 6,325,572 | B1 * | 12/2001 | Dietrich | B65G 53/14 406/146 |
| 2003/0077128 | A1 * | 4/2003 | Williams | B65G 53/16 406/173 |

FOREIGN PATENT DOCUMENTS

| | | |
|---|---|---|
| KR | 20-0188203 Y1 | 7/2000 |
| KR | 10-2001-0088155 A | 9/2001 |
| KR | 10-2003-0068523 A | 8/2003 |

* cited by examiner

[Fig. 1]
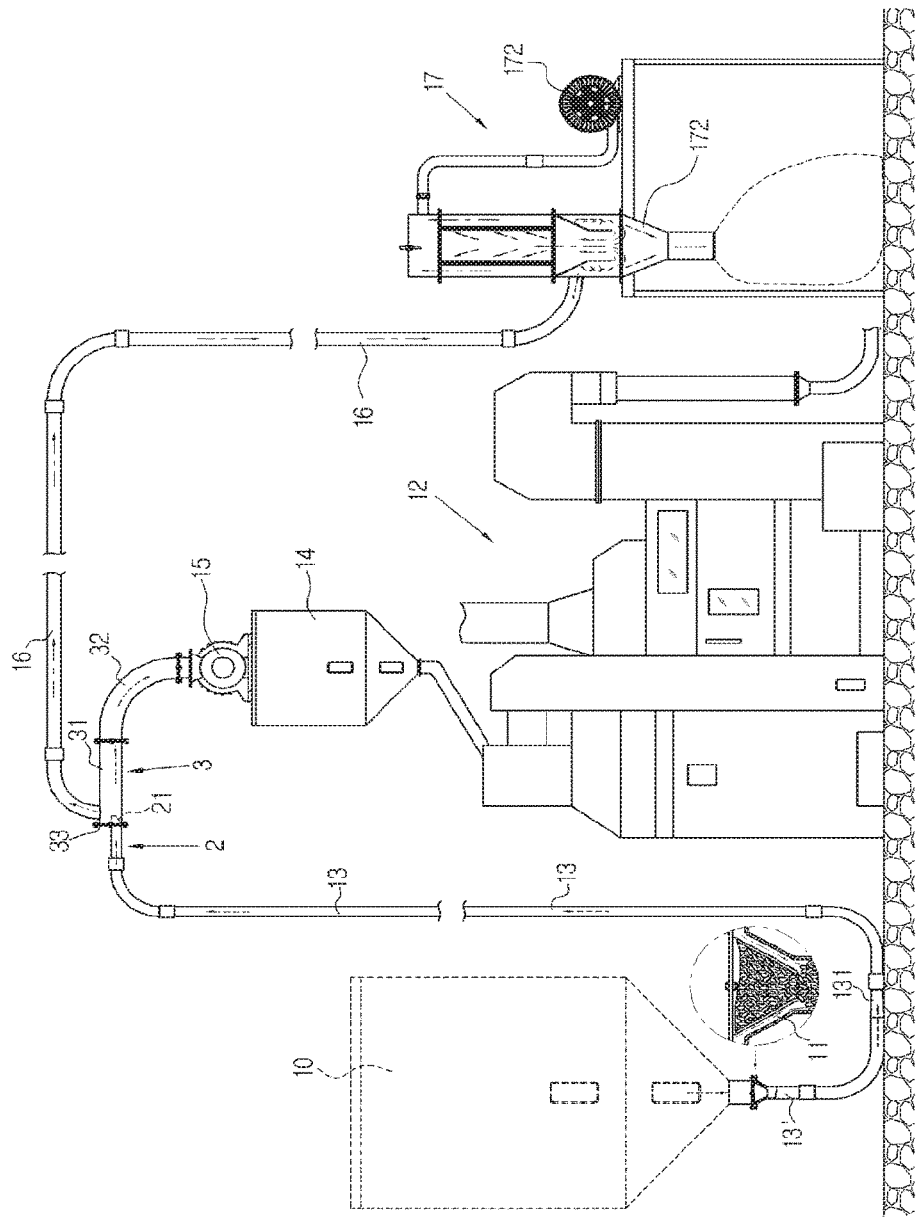

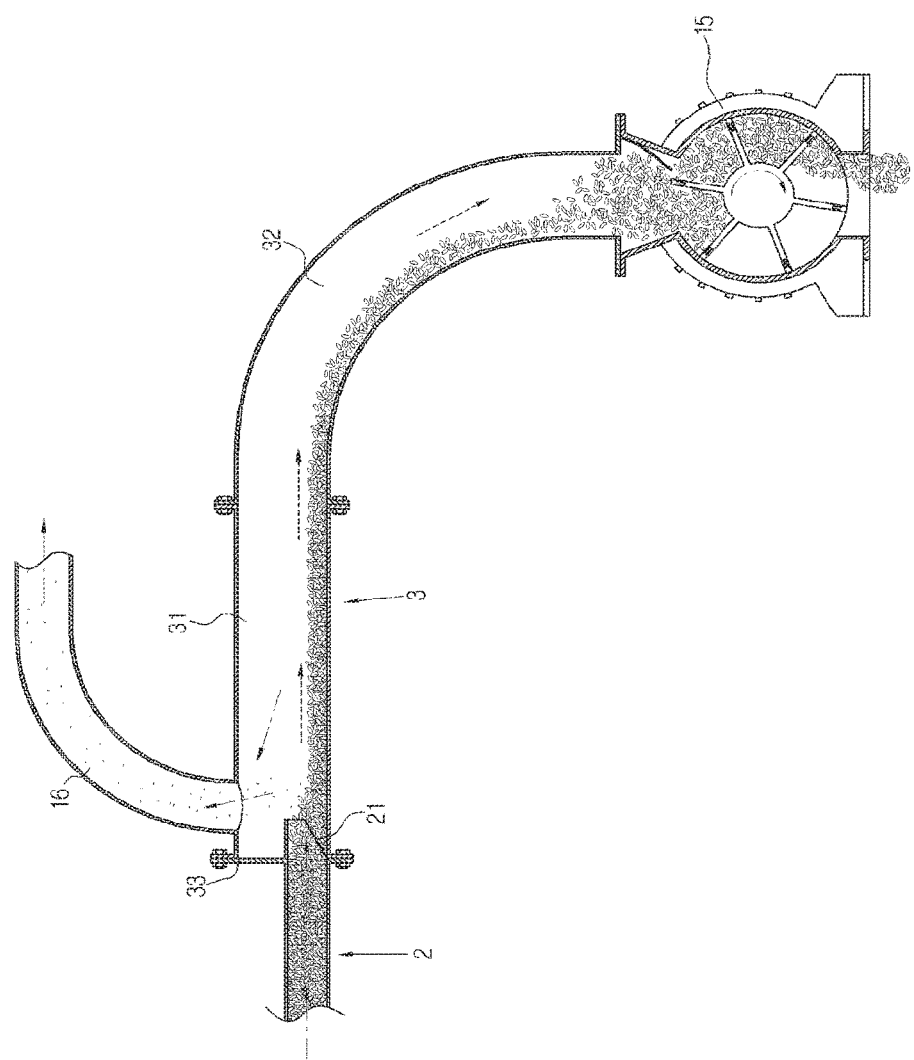
[Fig. 2]

[Fig. 3]
(A)
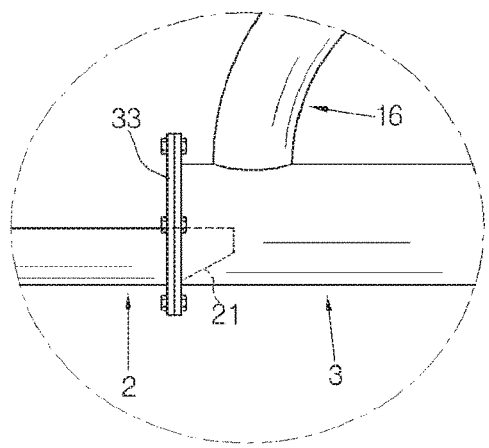
(B)
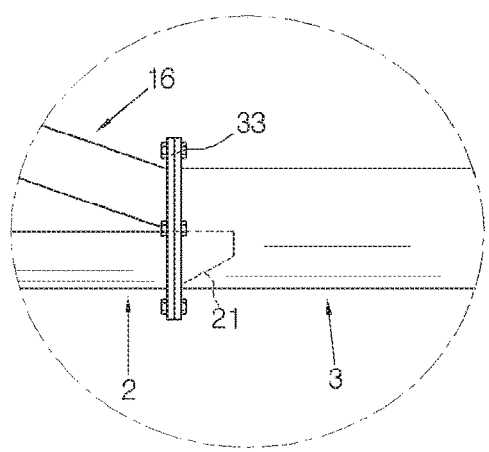
(C)
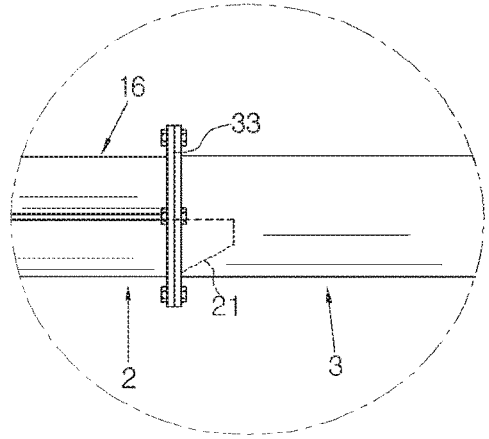

[Fig. 4]
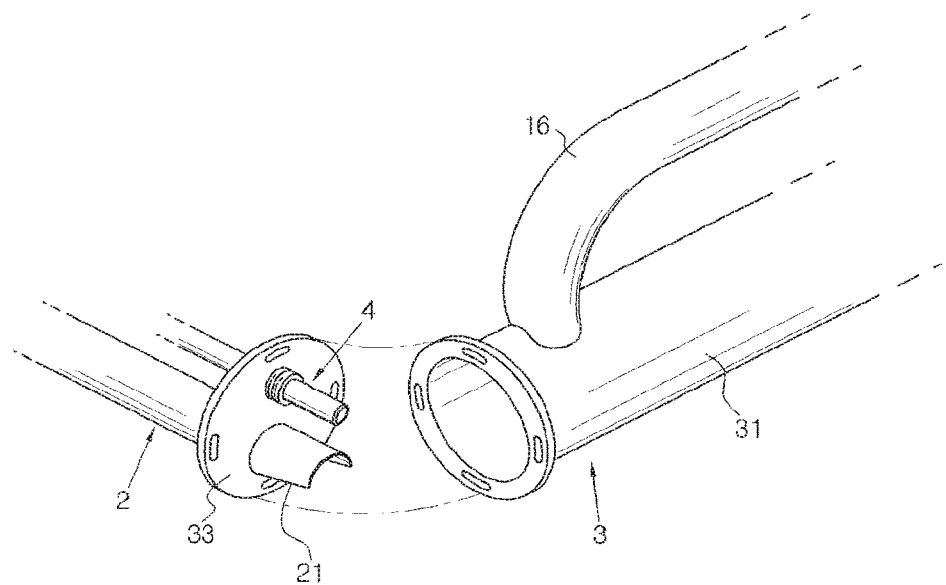
[Fig. 5]
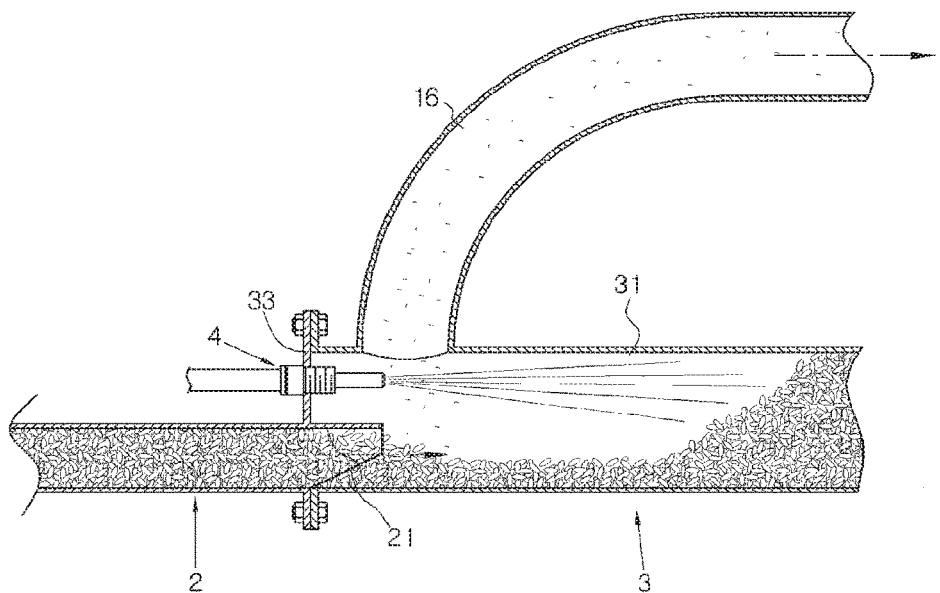

GRAIN CONVEYING APPARATUS USING AIR

CROSS REFERENCE TO RELATED APPLICATION

This application is a U.S. national stage application filed under 35 U.S.C. § 371 of International Application No. PCT/KR2015/010656, filed on Oct. 8, 2015, and further claims priority under 35 U.S.C. § 119(b) and 37 CFR 1.55 to Korean Application No. 10-2014-0154656, filed on Nov. 7, 2014.

TECHNICAL FIELD

The present disclosure relates to a grain conveying apparatus using air, and more particularly, to a grain conveying apparatus using air, which can efficiently collect foreign materials while moving grains upward to a position at which the grains are easily fed into a grain processing machine by using suction force of the air, and prevent damage to the grains by moving and separating the grains without shock.

BACKGROUND ART

In general, a grain conveying apparatus using air, which is divided into an air blowing type and an air suction type, conveys grains to a desired grain processing machine or storage.

For example, as the air blowing type, "Nozzle for Discharging Grains in Grain Conveying Apparatus Using Wind Pressure (Patent Document 1) and Device for Conveying Agricultural and Marine Products (Patent Document 2) have been proposed.

Patent Documents 1 and 2 disclose a structure for delivering the grains by using a fluid or air for conveying the grain and when the fluid or air moves while being in direct contact with the grains, the grains are damaged due to eddy current or collision and discharged together with foreign materials, and as a result, loss increases.

As another air blowing type, Wind Pressure Type Grain Elevator (Patent Document 3) and Delivery Apparatus Using Air Pressure (Patent Document 4) have been proposed.

Patent Documents 3 and 4 disclose a structure for separating foreign materials while moving the grains by blowing air. The grains are damaged due to impacts when the air and the grain come in contact with each other and impacts when the grains flow into a filtering mesh or a narrow outlet and discharged together with the foreign materials, and as a result, the loss increases.

Meanwhile, as the air suction type, Grain Suction Conveying Apparatus (Patent Document 5) has been proposed. In Patent Document 5, since the grains are conveyed by the suction force of the air, the damage of the grains is slight during conveying of the grains, but the grains which collide with a grain blocking body are scattered and dropped downward and the foreign materials having a relatively low specific gravity are discharged to an air inlet on the upper side in order to separate the grains from the foreign materials after conveying the grains. At this time, the grains which collide with the grain blocking body are damaged, and as a result, there is a problem that the grain collection rate is decreased. In addition, in Patent Document 5, there are problems that a structure of a separation container is complicated, a volume is large, manufacturing cost is expensive, and maintenance and management costs are increased

PRIOR ART DOCUMENT (Patent Document 1) Korean Utility Model Registration No. 20-0094662 (publicized on Oct. 4, 1995)
(Patent Document 2) Korean Utility Model Registration No. 20-0410435 (publicized on Mar. 9, 2006)
(Patent Document 3) Korean Utility Model Publication No. 20-1990-0009154 (publicized Oct. 6, 1990)
(Patent Document 4) Korean Utility Model Registration No. 20-0309795 (publicized on Apr. 11, 2003)
(Patent Document 5) Japanese Patent Laid-Open Publication No. 4327821 (issued on Sep. 9, 2009)

DISCLOSURE

Technical Problem

Accordingly, the present disclosure has been made to solve the problems in the related art and an object of the present disclosure is to provide a grain conveying apparatus using air. In the grain conveying apparatus, the grains are conveyed to a position of a separation pipe at which the grains are easily fed into a grain processing machine or storage by using air suction force and thereafter, separated and the grains are dropped and discharged and foreign materials are discharged to an upper exhaust pipe. At this time, a structure of the conveying apparatus is compactly enhanced to prevent the damage of the grains due to collision, to improve the efficiency of separation work, and to prevent clogging. As a result, grain collection rate can increase, manufacturing cost is reduced and management is convenient, and therefore it is very economical.

Technical Solution

An object to be achieved by the present disclosure is to provide a grain conveying apparatus using air. The grain conveying apparatus includes: a grain supply hopper for accommodating the grains; a conveyer pipe for guiding the grains supplied from the grain supply hopper and the air flowing in from an external air inlet such that the grains, by means of the air suction force, and the air are moved together; a grain discharge pipe connected to the end of the conveyer pipe; a separation pipe for separating the grains and the foreign materials, the separation pipe including a horizontal part connected to the grain discharge pipe and a downwardly curved part for dropping the grains; a rotary valve connected to the lower part of the curved part of the separation pipe so as to discharge the grains in predetermined amounts; an exhaust pipe for discharging the separated foreign materials to the outside; and an air suction means having a ring blower connected to the end of the exhaust pipe so as to suck the air, and the front end of the grain discharge pipe is provided to penetrate the lower side of a finishing plate for closing a coupled part of the separation pipe, an inner diameter of the grain discharge pipe and an inner diameter of the separation pipe are formed to be small in a ratio of 0.4 to 0.5:1 such that the internal pressure of the separation pipe is lowered due to a change in the pressure difference, and a cut inclined surface, to be inclined in the direction of the grain conveyer pipe, is formed at the lower part of the front end of the grain discharge pipe, so as to cover the upper part thereof in order not to be influenced by the air discharged to the exhaust pipe connected to the upper side of the separation pipe, and allows the grains to be discharged to the lower side of the horizontal part of the separation pipe having a large inner diameter.

Advantageous Effects

According to the present disclosure, not a blowing pressure feeding type suitable for a large size but a compact configuration which is a conveying type by suction force is provided. Further, foreign materials having a small specific gravity are easily discharged to an exhaust pipe when the grains discharged to the front end of a discharge pipe are placed on the bottom of a horizontal part of a separation pipe due to a pressure drop and a specific gravity difference, and the grains which are first fed by conveyance elastic force of next grains which are subsequently conveyed are naturally pushed down toward a vacuum rotary valve without causing big collision. Therefore, an efficiency of a separation operation increases and the damage of the grains is prevented, as a result, it is possible to increase the grain collection rate.

Further, according to the present disclosure, when the grains are accumulated at the horizontal part of the separation pipe and the separation pipe is blocked, the grains are dropped toward the vacuum rotary valve by actuating an air injection nozzle to enable a continuous operation, and as a result, a productivity increases and a structure is still more compact than those of the existing apparatuses, and thus, manufacturing cost is reduced and management is convenient. Therefore, the present disclosure is very economical.

DESCRIPTION OF DRAWINGS

FIG. 1 is a front view schematically illustrating a grain conveying apparatus using air according to the present disclosure.

FIG. 2 is a partially enlarged cross-sectional view illustrating an operational state of a principal part of the grain conveying apparatus using air according to the present disclosure.

FIG. 3 is a schematic view illustrating a mounting position of an exhaust pipe of the grain conveying apparatus using air according to the present disclosure by extending each embodiment.

FIG. 4 is an exploded perspective view illustrating a coupling state of a discharge pipe, a separation pipe, and an air injection nozzle which are principal parts of the grain conveying apparatus using air according to the present disclosure.

FIG. 5 is a partially enlarged cross-sectional view illustrating the operational state of the air injection nozzle of the grain conveying apparatus using air according to the present disclosure.

[Reference Signs List]

| | |
|---|---|
| 10: Grain supply hopper | 11: External air inlet |
| 12: Grain processing machine | 13: Conveyer pipe |
| 14: Grain collection hopper | 15: Rotary valve |
| 16: Exhaust pipe | 17: Air suction means |
| 13': Inlet | 131: Reducer |
| 171: Ring blower | 172: Dust collector |
| 2: Grain discharge pipe | 21: Cut inclined surface |
| 3: Grain separation pipe | 31: Horizontal part |
| 32: Curved part | 33: Finishing plate |
| 4: Air injection nozzle | |

MODES OF THE INVENTION

Hereinafter, a preferred embodiment of the present disclosure will be described in detail with reference to the accompanying drawings.

A grain conveying apparatus using air according to the present disclosure which is not the existing blow pressure feeding type but a conveyance type by suction force uses a grain supply hopper 10 accommodating grains, a conveyer pipe 13 guiding the grains and air to move upward to the upper side of a grain processing machine 12 by means of air suction force together with the grains supplied from the grain supply hopper 10 and the air which flows in from an external air inlet 11, a vacuum rotary valve 15 receiving the grains supplied from the conveyer pipe 13 and thereafter, dropping the grains to a grain collection hopper 14 of the grain processing machine 12, an exhaust pipe 16 discharging the separated foreign materials to the outside, and an air suction means 17 having a ring blower 171 connected to the end of the exhaust pipe 16 to suction the air as illustrated in accompanying FIG. 1.

In addition, the conveyer pipe 13 is configured by connecting multiple straight-line type and elbow type pipes with general sockets, pipe fittings, and the like and as shown in a principal part enlargement part of accompanying FIG. 1, a funnel-shaped inlet 13 connected with an outlet of the initial grain supply hopper 10 and the external air inlet 11 is connected to a reducer 131 while an inner diameter of the inlet 13' is a little larger so as to assist smooth flow-in of the grains to enable the grains and the air to move together.

Further, the grain processing machine 12 is one of apparatuses which perform functions including grain-polishing, roasting, washing, drying, mixing, and the like.

In addition, the grain collection hopper 14 stores the grains which move to the conveyer pipe 13 so as to supply the grains to the grain processing machine 12 and the vacuum rotary valve 15 disposed thereon is actuated to rotate only when dropping the collected grains while closing a passage of the grain collection hopper 14 so as to transfer the air suction force to the conveyer pipe 13.

Further, the exhaust pipe 16 is also configured by connecting multiple straight-line type and elbow type pipes with general sockets, pipe fittings, and the like and configured to generate air current for conveying the grains while suctioning and discharging the air in the conveyer pipe 13 and the exhaust pipe 16 by connecting the ring blower 171 as the air suction means 17 to the end of the exhaust pipe 16.

In addition, a cyclone type dust collector 172 having a general filter is mounted on the suction means 17 so as to collect the separated foreign materials.

The foreign materials refer to, for example, worms, seams, beards of rice, and the like.

Meanwhile, a core technology of the present disclosure is used for increasing collection rate by compactly enhancing a structure so as to prevent the grains from being damaged through minimization of occurrence of shock in the conveyed grains and easily separate the foreign materials. As illustrated in accompanying FIGS. 2 and 3, a grain discharge pipe 2 of which the front end is opened is mounted on the end of the conveyer pipe 13 and a separation pipe 3 separating the grains and the foreign materials is provided. The separation pipe 3 is provided with a downwardly curved part 32 so as to be connected to a horizontal part 31 connected with the discharge pipe 2 and the inlet of the rotary valve 15.

In addition, the inner diameter of the discharge pipe 2 is formed to be smaller than the inner diameter of the separation pipe 3, and as a result, an internal pressure of the separation pipe 3 is configured to decrease through a change in pressure difference.

Further, the front end of the discharge pipe 2 is mounted to penetrate the lower side of a finishing plate 33 closing a coupled part of the separation pipe 3 and the inlet of the exhaust pipe 16 is connected so as to be positioned above the front end of the discharge pipe 2 so that foreign materials having a small specific gravity are discharged while suctioning and moving the grains and the air.

That is, the inlet of the exhaust pipe 16 is connected to the separation pipe 3 positioned above the front end of the discharge pipe 2 as illustrated in FIG. 3(A) or is connected to the upper side of the finishing plate 33 that couples the discharge pipe 2 while closing the separation 3 in an inclined or horizontal state to discharge the foreign materials as illustrated in FIGS. 3(B) and 3(C).

Further, a cut inclined surface 21 is formed below the front end of the discharge pipe 2, which is inclined in the direction of the grain conveyer pipe 13. That is, the cut inclined surface 21 is inclined in the direction of the grain conveyer pipe 13 when the cut inclined surface 21 is linked from the upper part to the lower part of the front end of the discharge pipe 2. Thereby, the cut inclined surface 21 serves as a blocking plate covering the upper part so as not to be influenced by the air discharged to the exhaust pipe 16 connected to the upper side spouts the discharged grains to spread the grains to the lower side of the horizontal part 31 of the separation pipe 3 having the large inner diameter at a portion of the inclined surface 21 having a wide opening area and allows the grains sequentially pushed by the grains which are continuously pushed to be dropped and stacked.

Meanwhile, in order to smoothly move the grains filled in the grain supply hopper 10 by the suction force of the ring blower 171 of the air suction means 17, the inner diameter of the discharge pipe 2 and the inner diameter of the separation pipe 3 are formed at a ratio of 0.4 to 0.5:1 and the inner diameter of the separation pipe 3 and the inner diameter of the exhaust pipe 16 are formed at a ratio of 0.5 to 0.6:1.

In addition, when the grains in the grain supply hopper 10 is conveyed to the grain collection hopper 14 mounted on the upper part of the grain processing machine 12 by the suction force of the ring blower 171 of the air suction means 17, the spaces of the separation pipe 3 and the rotary valve 15 portions are closed and the inlet 13' of the conveyer pipe 13 is opened, and as a result, the suction force of the ring blower 171 serves as air current actuation force to convey the grains and external air and the grains move toward the grain discharge pipe 2 at the end of the conveyer pipe 13 to move the grains to the inside of the horizontal part 31 of the separation pipe 3 of which the pressure decreases and the grains which are sequentially pushed by the grains which are continuously pushed out and dropped and stacked are discharged to the grain collection hopper 14 by actuating the vacuum rotary valve 15.

Further, the grains which move to the horizontal part 31 of the separation pipe 3 are not discharged to the exhaust pipe 16 by the specific gravity and are pushed by the grains which are continuously conveyed not to be dropped to the rotary valve 15 but sequentially stacked, and as a result, the horizontal part 31 of the separation pipe 3 may be blocked. Therefore, in order to release the blocking, an air injection nozzle 4 is mounted on the upper side of the finishing plate 33 closing the coupled part of the separation pipe 3 as illustrated in accompanying FIGS. 4 and 5.

In addition, in the case of the air injection nozzle 4, a sensor (not illustrated) is mounted on the inlet of the rotary valve 15 or the inlet of the grain collection hopper 14 to sense that the grains are dropped not to be stacked and the air injection nozzle 4 is actuated by a signal of the sensor.

Next, an operation process of the grain conveying apparatus using air according to the present disclosure, which is configured as above will be described.

In the present disclosure, since the air current is generated by the air suction force to convey the grains, a capacity of the ring blower 171 of the air suction means 17 and specifications of the conveyer pipe 13, the exhaust pipe 16, the discharge pipe 2, and the separation pipe 3 are most important.

Accordingly, in the exemplary embodiment, the ring blower 171 has 2.5 to 3.7 Kw, 4 to 5 HP, and suction 2500 to 2800 mmAq, the inner diameter of the separation pipe 3 is based on 100 Ø, the inner diameters of the conveyer pipe 13 and the discharge pipe 2 are in the range of 40 to 50 Ø, the inner diameter of a portion of the conveyer pipe 13 where the outlet of the grain supply hopper 10 and the external air inlet 11 are connected to each other is in the range of 55 to 65 Ø and is connected to the reducer 131, and the inner diameter of the exhaust pipe 16 is configured by 50 to 60 Ø.

First, when the ring blower 171 is actuated while the grains are filled in the grain supply hopper 10, the air in the exhaust pipe 16 preferentially moves to be discharged to the outside through the dust collector 172 by the ring blower 171.

During such a process, air movement of the exhaust pipe 16 causes the air in the grain separation pipe 4 to be subsequently discharged and the air movement of the separation pipe 4 causes the air in the conveyer pipe 13 to move again because the vacuum rotary vale 15 closes the passage of the grain collection hopper 14.

That is, the air suction force of the ring blower 171 safely drops the grains in the grain supply hopper 10 and the air which flows in from the external air inlet 11 to the inlet 13' of which the inner diameter is enlarged so as to make the grains and the air flow into the front end of the conveyer pipe 13 by conveyance air current generated at the time of sequentially discharging the air which exists in the exhaust pipe 16, the separation pipe 3, the grain discharge pipe 2, and the conveyer pipe 13. In this case, the air which flows in from the external air inlet 11 serves to guide the grains to safely flow into the inlet 13' while being sucked into the inlet 13'.

Subsequently, the grains filled in the inlet 13' at the front end of the conveyer pipe 13 are changed to density increase and pressure increase states while flowing into a main pipe which is the conveyer pipe 13 of which the inner diameter connected to the reducer 131 is reduced together with external flow-in air. As a result, the grains and the external air are conveyed up to the grain discharge pipe 2 at the end of the conveyer pipe 13 by the conveyance air current by actuation of the air suction force of the ring blower 171.

Subsequently, the grains and the external air which pass through the front end of the grain discharge pipe 2 serving as an orifice are pushed out to the horizontal part 31 of the grain separation pipe 3 of which the inner diameter is extended. The separation pipe 3 is a portion where pressure decreases and the grains conveyed by a wide opening space of the cut inclined surface 21 of the discharge pipe 2 are pushed out while being spread to the horizontal part 31 of the separation pipe 3 and the grains are placed on the bottom of the horizontal part 31 of the separation pipe 3 due to the specific gravity difference, and the external air and the foreign materials which are conveyed together flows into the exhaust pipe 16 connected to the upper part of the separation pipe 3 at the upper part of the front end of the grain discharge pipe 2 or the upper side of the finishing plate 33 and thereafter, the foreign materials are collected through the dust collector 172 and the ring blower 171 and the air is discharged to the outside.

When such a process is repeatedly performed, the grains discharged from the discharge pipe 2 are spread to the horizontal part 31 of the separation pipe 3 as illustrated in accompanying FIG. 2, subsequently the grains which first flow into the horizontal part 31 of the separation pipe 3 are pushed out and positioned at the upper side of the curved part 32. Then, the grains are immediately dropped and collected among a plurality of rotation blades of the vacuum rotary pump 13 and when a predetermined quantity of grains are collected, the rotation blades of the rotary pumps 13 are sequentially rotated clockwise by a control means (not illustrated) to store the grains in the grain collection hopper 14 supplying the grains to the grain processing machine 12.

Therefore, according to the present disclosure, unnecessary external apparatuses do not collide with each other while the grains are conveyed by a compact structure including the grain discharge pipe 2 that serves as the orifice while conveying the grains together with the air current generated by the air suction force of the ring blower 171 and the cut inclined surface 21, the grain separation pipe 3 that causes the pressure difference and enables the conveyed grains to be spread and the foreign materials to be easily separated, and the position of the inlet of the discharge pipe 16. Thereby, a problem that the grains are damaged may be solved and manufacturing cost may be minimized.

Further, as illustrated in accompanying FIG. 5, the grains which are pushed out from the grain discharge pipe 2 are accumulated in the horizontal part 31 of the separation pipe 3 by the specific gravity and thereafter, sequentially pushed out and dropped to the vacuum rotary valve 15, but then, when the grains are further accumulated and the separation pipe 3 is thus blocked, the accumulated grains are blown by the air by using the air injection nozzle 4 mounted on the upper side of the finishing plate 33 closing the coupled part of the separation pipe 3 to be dropped to the rotary pump 13 to easily perform a conveyance operation of the grains, thereby enhancing productivity.

The preferred exemplary embodiment of the present disclosure has described and illustrated hereinabove, but the present disclosure is not just limited to the illustrated and described configuration and actions. Accordingly, since it is well appreciated by those skilled in the art that appropriate changes and modifications of the embodiment can be made, it should be regarded that the appropriate changes and modifications and equivalents thereto are included in the scope of the present disclosure.

The invention claimed is:

1. A grain conveying apparatus using air, comprising:
a grain supply hopper for accommodating the grains;
a conveyer pipe for guiding the grains supplied from the grain supply hopper and the air flowing in from an external air inlet such that the grains, by means of the air suction force, and the air are moved together;
a grain discharge pipe connected to the end of the conveyer pipe;
a separation pipe for separating the grains and the foreign materials, the separation pipe including a horizontal part connected to the grain discharge pipe and a downwardly curved part for dropping the grains;
a rotary valve connected to the lower part of the curved part of the separation pipe so as to discharge the grains in predetermined amounts;
an exhaust pipe for discharging the separated foreign materials to the outside; and
an air suction means having a ring blower connected to the end of the exhaust pipe 16 so as to suck the air,
wherein the front end of the grain discharge pipe is provided to penetrate the lower side of a finishing plate for closing a coupled part of the separation pipe, an inner diameter of the grain discharge pipe and an inner diameter of the separation pipe are formed to be small in a ratio of 0.4 to 0.5:1 such that the internal pressure of the separation pipe is lowered due to a change in the pressure difference, and a cut inclined surface, to be inclined in the direction of the grain conveyer pipe, is formed at the lower part of the front end of the grain discharge pipe, so as to cover the upper part thereof in order not to be influenced by the air discharged to the exhaust pipe connected to the upper side of the separation pipe, and allows the grains to be discharged to the lower side of the horizontal part of the separation pipe having a large inner diameter.

* * * * *